(12) United States Patent
Olivier et al.

(10) Patent No.: US 10,749,844 B2
(45) Date of Patent: Aug. 18, 2020

(54) DE-IDENTIFYING DISTRIBUTED BRIDGING NETWORK PLATFORM

(71) Applicant: LifeQ Global Limited, Dublin (IE)

(72) Inventors: Laurence Richard Olivier, Alpharetta, GA (US); Riaan Conradie, Alpharetta, GA (US); Franc Paul, Den Dolder (NL)

(73) Assignee: LifeQ Global Limited, Dublin (IE)

( * ) Notice: Subject to any disclaimer, the term of this patent is extended or adjusted under 35 U.S.C. 154(b) by 150 days.

(21) Appl. No.: 15/721,079

(22) Filed: Sep. 29, 2017

(65) Prior Publication Data

US 2018/0097780 A1 Apr. 5, 2018

Related U.S. Application Data

(60) Provisional application No. 62/402,424, filed on Sep. 30, 2016.

(51) Int. Cl.
| | | |
|---|---|---|
| *H04L 29/06* | (2006.01) | |
| *H04L 29/08* | (2006.01) | |
| *G06Q 20/38* | (2012.01) | |
| *G06F 21/62* | (2013.01) | |

(52) U.S. Cl.
CPC ...... *H04L 63/0421* (2013.01); *G06F 21/6245* (2013.01); *G06Q 20/385* (2013.01); *H04L 67/10* (2013.01); *H04L 63/08* (2013.01); *H04L 67/306* (2013.01)

(58) Field of Classification Search
CPC combination set(s) only.
See application file for complete search history.

(56) References Cited

U.S. PATENT DOCUMENTS

| 2002/0169793 | A1* | 11/2002 | Sweeney ............. G06F 21/6245 |
| 2009/0271412 | A1 | 10/2009 | Lacapra et al. |
| 2011/0301968 | A1* | 12/2011 | Godwin ............. G06F 19/3456 705/2 |
| 2014/0059658 | A1 | 2/2014 | Stecher |
| 2014/0287723 | A1* | 9/2014 | LaFever ............. G06Q 30/0271 455/411 |

(Continued)

OTHER PUBLICATIONS

Notification of Transmittal of the International Search Report and the Written Opinion of the International Searching Authority, for PCT Application No. PCT/US17/54506, filed Sep. 29, 2017, 16 pages, dated Dec. 14, 2017.

(Continued)

*Primary Examiner* — Khoi V Le
(74) *Attorney, Agent, or Firm* — Smith Gambrell & Russell LLP

(57) ABSTRACT

Computer implemented systems and methods are presented comprising a platform coordinating data flows between data acquisition, data transformation and data delivery nodes, whilst protecting the identities of all entities whose data is being acquired, transformed, stored, and/or delivered. Meta-data usage from different data transformation flows enables the platform to facilitate value distribution back to nodes and data subjects that contributed to output, enabling individual companies and/or data subjects subscribed to the platform to assess how and by whom their data is utilized in order to produce specific outputs, with the personal data of all entities being de-identified.

18 Claims, 5 Drawing Sheets

(56) References Cited

U.S. PATENT DOCUMENTS

2014/0344056 A1    11/2014   Maller

OTHER PUBLICATIONS

Copy of the Extended European Search Report issued by the European Patent Office for corresponding application No. 17857558.5; 8 pages.
Copy of the Eurasian Office Action dated Apr. 22, 2020 for corresponding Eurasian Patent Application No. 201990854; 2 pages.

* cited by examiner

DE-IDENTIFYING DISTRIBUTED BRIDGING NETWORK PLATFORM

CROSS-REFERENCE TO RELATED APPLICATIONS

This application claims the benefit of U.S. Provisional Patent Application No. 62/402,424, filed Sep. 30, 2016, which is incorporated by reference herein in its entirety.

BACKGROUND

Field

Embodiments of the present invention relate to the field of data processing.

Background

Only a few major companies claim ownership of the vast majority of detailed and temporal user information. Regulations around the sharing of personal information, as well as identifying user information, excludes companies from ready access to information needed to understand how to tailor products towards an individual. Complementary companies with different core competencies are often forced to build complete vertical solutions, or engage in lengthy negotiations, in order to enable them to participate as a component in a full market solution. As part of a vertical solution, companies create the same set of processes required to be in business, including: financial functions (e.g., billing and invoicing) and legal functions (e.g., pricing and joint venture agreements and memoranda of understanding). All of these mentioned functions are paramount to high transactional costs. Moreover, companies need to invest heavily in market research, to objectively understand market and subsequent resource needs, as well as business development, to find partners to complement core competencies to provide for the need of the market and realize the best market potential.

Additional challenges companies face include appropriate pricing of products and redistribution of revenue to respective companies that contributed to the delivery of their product or service. Many potential products never reach the market because of high overhead costs involved in setting up a complete vertical and finding market fit.

On the data subject level, with increased awareness regarding privacy of data flows, it is difficult to track personal data flows through different companies to deliver products into the products and services used by the data subject. A data subject may be a person, individual, data owner, customer, or the like. It is therefore difficult for the data subject to obtain a complete snapshot of data flow from and towards them. In a fast growing industry with a highly dynamic marketplace and various products and services, data subjects are unaware of all products and services they could utilize or tap into to make the most of their data and resources. Data subjects have to trust a handful of companies with all of their identifiable information, often stored in single silos that are more susceptible to detrimental data breaches. Personal user information should reside with the party the data subject trusts to keep it safe, and only anonymized or de-identified data should be shared with other authorized parties. Additionally, data subjects are paying high prices for data products and services as lots of transactional costs are duplicated. Lastly, few, if any, mechanisms exist for users to contribute their data to a network that would be able to exchange their data without exposing them or having access to their personal information.

Therefore, there is a need for a system and method that addresses the above-mentioned challenges and needs faced by both companies and individuals.

BRIEF SUMMARY

An embodiment of Distributed Bridging Network (DBN) platform aims to provide computer-implemented systems and methods capable of coordinating data flows between various services across nodes. A node may provide a service via a computing device. In an embodiment, the node may receive the service output of another node. In an aspect, the nodes are capable of carrying out two general functions: reading and writing. In an aspect, the reading functions can include subscribing to services provided by other nodes and consuming data. In another aspect, the writing functions can include data acquisition, data transformation, data storage and data delivery. An embodiment of the DBN platform aims to coordinate the data produced by the general functions discussed above between the various nodes and services, as well as facilitating value distribution back to nodes and data subjects that have contributed to output, whilst de-identifying all data-subjects, contributors and/or subscribers associated with the nodes and their services. An embodiment of the DBN platform coordinates data flow between nodes by utilizing metadata generated from data acquisition, transformation and delivery flows, whilst not having access to the actual data. This enables individual companies and/or data subjects to quantitatively assess how and by whom their data is utilized in order to produce specific outputs, whilst protecting identities of all data subjects, users, contributors and subscribers to the platform.

An embodiment of the invention addresses the challenges and shortcomings of prior art systems by presenting platforms capable of coordinating data flows between nodes performing data acquisition, data transformation, data storage and data delivery functions, whilst de-identifying all data subjects utilizing and/or subscribing to said platform. The platform coordinates data flow between platform subscribers without having access to actual data, and enables nodes performing different data acquisition, data transformation, data storage and data delivery functions to produce specific products and/or services without building complete business verticals.

These and other objects and advantages will become apparent from the following detailed description. Both the foregoing general description and the following detailed description are exemplary and explanatory only and are intended to provide further explanation of embodiments of the invention as claimed. The accompanying drawings are included to provide a further understanding of the invention and are incorporated in and constitute part of this specification.

BRIEF DESCRIPTION OF THE DRAWINGS/FIGURES

DETAILED DESCRIPTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

Figure 1:
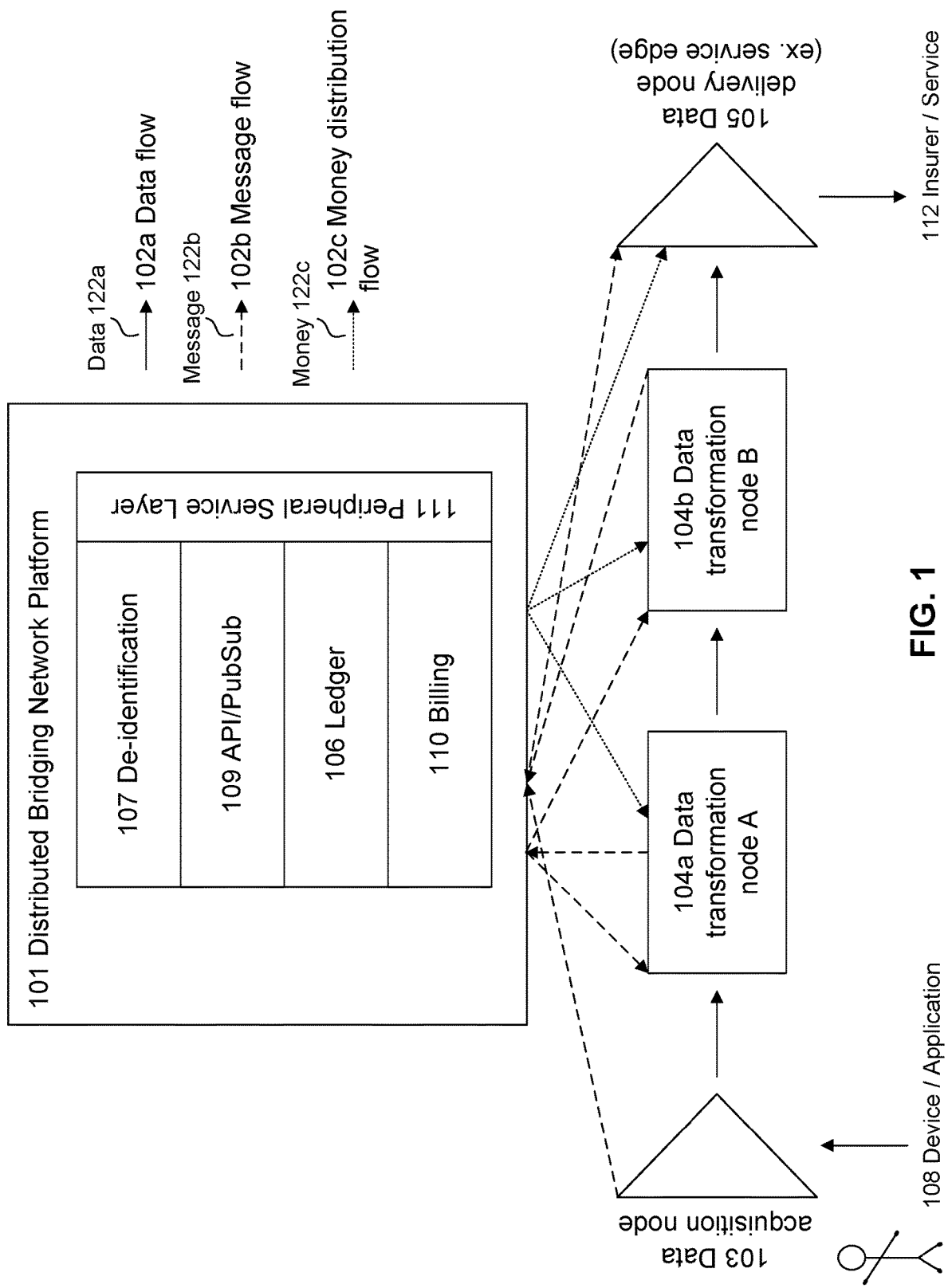
FIG. 1 is a block diagram illustrating a DBN platform and nodes that are involved in a de-identified data exchange, according to an example embodiment.

An embodiment of the claimed invention comprises a Distributed Bridging Network (DBN) platform 101 (see FIG. 1). DBN Platform 101 may also be referred to as a data broker network, although it is to be understood by a person of ordinary skill in the art that while payment may be rendered for services provided to analyze the data, the data at issue is not actually being exchanged for monetary gain. DBN platform 101 is capable of coordinating data flows 102a, message flows 102b and money distribution flows 102c between multiple nodes. Nodes may provide services via a computing device. In an aspect, two general classifications of types of actions can be performed by the nodes: reading and writing. Reading actions by the nodes can include, but are not limited to, subscribing to data services of other nodes, as well as consumption of the data provided. In addition, the writing actions can include, but are not limited to, the publishing of the data, supplying of data, acquiring data for later use, collecting, transforming, and providing any transformed/collected/acquired data. In an aspect, the various nodes can perform both types of actions at various times in the lifetime of the node. For example, a node can supply/acquire data at one time, transform data upon request at a later date, and/or transmit the data at a different time. In an aspect, as shown in FIG. 1, the services of the nodes of the system are assigned different functions for particular data. In an embodiment, the node 103 may provide data acquisition services, nodes 104a and 104b may provide transformation services, and node 105 may provide delivery services. While FIG. 1 illustrates the nodes 103, 104a, 104b, and 105 as performing certain functions, as discussed above, the nodes can perform different functions (e.g., read and/or write) at particular times, which can be based upon the needs of the organization/entity associated with the node. Therefore, the nodes of various aspects of this invention should not be limited to the types of functionalities as discussed above.

In an aspect, the platform 101 utilizes a ledger database 106, discussed in detail below, to track various flows between the nodes, enabling, amongst other things, the facilitation of value distribution back to nodes that have contributed to an output (e.g., transforming data, acquiring data and distributing data) while de-identifying all data subjects participating and/or subscribing to the platform.

The data flows 102a can be flows of any type of data 122a generated by any data source. For example, the data source can be a weather monitoring entity that provides up to the minute data of the weather at various locations. Examples of data 122a include, but are not limited to, physiological data generated by a personal wearable device or medical device 108, computer/smartphone application data, insurance data, actuarial data, Global Positioning System (GPS) data, socio-economic data, medical records data, genetic data generated by a personal wearable device or medical device 108, and any type of data that has value to an entity. The DBN platform 101, via a de-identification unit 107, protects the identities of all data subjects participating on the DBN platform 101.

In an aspect, the DBN platform 101 manages the connections between contributor nodes and consumer nodes through the use of message flows 102b. The messages 122b are communicated between the DBN platform 101 and the various nodes 103, 104a, 104b, and 105 utilizing the platform 101 via message flows 102b. In an aspect, the message 122b includes the metadata associated with the nodes, as well as the services that the nodes are providing and/or seeking. By utilizing only the metadata from the message 122b, as well as the services identified as being desired or provided, the DBN platform 101 can maintain the privacy of the originating data. In an exemplary aspect, the DBN platform 101 can manage the data flows between the various nodes through the ledger database 106, capturing the metadata of the various nodes as the data is transformed, gathered, and/or distributed. By managing only the connections between the nodes 103, 104a, 104b, and 105, and collecting only the metadata, the DBN platform 101 does not have access to the data itself. By utilizing metadata, said DBN platform 101 can also facilitate value distribution back (i.e., identifying how each node contributed to the system as a whole; e.g., a percentage of the contribution) to nodes 103, 104a, 104b, and 105 that have contributed to output, enabling individual companies and/or data subjects to assess and quantify how and by whom their data inputs and/or outputs is utilized in order to produce specific products and/or services.

Various nodes of different sources, as well as nodes capable of providing various services, can be utilized by the DBN platform 101 according to an aspect of the present invention. Referring back to FIG. 1, the various nodes can be classified as various types of contributor nodes based on the services they provide (e.g., node 103 by data acquisition services, nodes 104a and 104b by data transformation services, and node 105 by data supplier services) that supply the data ultimately to a consumer node 112 (as shown, a service company). These contributor nodes will communicate messages 122b to the DBN platform 101, with the DBN platform 101 acting as a central hub for the network. Various types of messages may be exchanged between the nodes and the DBN platform 101. These messages, for example, may be subscription messages, publish messages, or messages containing metadata or indications about the nodes or their services. In an aspect, the contributor nodes will provide in the message 122b (in this example, a publish message) indications as to the services that they are providing. Upon receiving the message 122b with the publish message, the hub/DBN platform 101 will take the metadata of the contributing node and store it (discussed below), and then pass along the message of the publish message to subscriber nodes. For example, as shown in FIG. 1, a data acquisition node 103 can send a message to the DBN platform 101, which is then passed along to the data transformation nodes 104a, and 104b, as well as the data delivery node 105. Further, as shown in FIG. 1, the data 122a then only flows directly from the various nodes 103, 104a, 104b, and 105 without passing through the DBN platform 101.

Said de-identified DBN platform (101) may be comprised of the following core components: a shared application program interface (API) authentication and token authorization scheme 109, a ledger database 106, a billing engine 110, a user relationship management system (not shown specifically, but according to an aspect, combinations of various subsystems of the ledger database 106 and de-identification systems 107), and a verification system 114.

The shared application program interface (API) authentication and token authorization scheme 109 that allows trusted communication between parties, for example between an individual party and insurance parties. In an aspect, the API scheme 109 uses a standard REST approach, with secure authentication (e.g. basic authorization request headers, over secure https, using BCrypt algorithms to counter any possible brute force attacks) that allows participants to trust each other by virtue of them all trusting the CORE. In other aspects, other approaches can be used that allow the participants to trust one another.

The ledger database 106 that keeps track of all API transaction metadata in the platform (which data of which party is being pushed between which services). In an aspect, the ledger database 106 can function similar to a database. For example, the ledger database 106 can be implemented with a blockchain, a relational database, a key value store, and the like. In other aspects, the ledger database 106 can utilize other forms of tracking to keep up with all of the API transaction metadata.

The billing engine 110 that calculates periodically (exemplified by, but not limited to, monthly billing) how to bill and distribute fees. The billing engine 110 can take information from other components to calculate a monetary value for a service per participant (i.e., nodes) in a transaction. A monetary value may include revenue share, price, earnings, attribution, money, rates, billing information, fees, or cost corresponding to a service provided by a node. In an embodiment, the billing engine 110 calculates the monetary value corresponding to services provided by a node. In another embodiment, the billing engine 110 may conduct financial transactions with the nodes or data subject to distribute the corresponding monetary values (e.g. earnings, money, . . . ), or to receive them (e.g. costs, bills, . . . ). In an aspect, the billing engine 110 relies on the other components of the DBN platform 101 (e.g., the ledger database 106 and API scheme 109) to provide information it needs. For example, the interactions, messages, subscriptions, etc. that flow through the platform 101 are stored in the ledger database 106. The ledger database 106 can also include the necessary calculations needed for the calculation of rates, including the offsetting and redistribution of rates—these calculations can be based on rules set by the service node and influenced by negotiations and feedback from the rest of the network.

The user relationship management system (not shown specifically, but according to an aspect, combinations of various subsystems of the ledger database 106 and de-identification unit 107) ensures that a user's data is only transferred between parties that the user has allowed and who are good actors on the network. The DBN, via the de-identification unit 107, generates a globally unique identifier (GUID) for each combination of a node and a data subject, and uses that GUID for all communication with the specific node regarding the data subject's data. In this manner it is ensured that all data flow within the network is de-identified via the de-identification unit 107, each GUID is only valid and meaningful for a single node, and no node can access the GUID specific to a different node. The user maintains a primary relationship with the party holding his/her personal information. User relationships are respected on the data supply and data consume ends of a flow. In an aspect, a user will have a login with each of these entities, and an OAuth2 flow, for example, would be followed to authorize each service to act on the data of the data subject. As it is clear to those skilled in the art, other types of authorization and authentication may also be used. Because of the de-identification, as further described below, transformation services in between the supply and consume services would not know whose data they are operating on. The user relationship management system will provide a de-identified GUID to each party that only authorized services with direct data subject relationship can relate back to an actual identity (who has an existing relationship with the service). This means that the DBN keeps track of which services have been authorized and given consent by the data subject, and only those will be given enough information to process data related to the data subject—as long as the authorization remains valid; a data subject can cancel it at any time.

In an embodiment, a registrar 116 (FIG. 3) in the platform 101 stores a profile for each data subject. The registrar contains no personal information about the data subject, and maintains its own identifier for the data subject. In order to generate a GUID, a node (e.g. node 103) sends a request for a token to the registrar, and the registrar sends the requested token to the node. The token contains the registrar's identifier for the data subject, rather than information about the data subject itself. The node receives the token and sends the received token to the platform 101 with a request for a GUID. The platform 101 generates a GUID for the combination of the data subject and the requesting node. Further details regarding the use of GUIDs will be discussed below with regards to message flow.

In an embodiment, the verification system 114 (FIG. 3) ensures that a service only uses an individual's data as specified (i.e. the receiving company delivered the output that was expected) by explicit consent. In an embodiment, the verification system may compare the information about the individual's consent to the information about the service and its input and/or output. In an aspect, the verification system can rely on community curation for verification purposes. In an aspect, the community curation can comprise community reviews, submission of services, and the like that provide some sort of feedback on the effectiveness and availability of services. Such feedback may be regarding the accuracy, quality, or usefulness of the service and its output.

In addition to said core components, the platform 101 may also comprise peripheral service layer components 111, exemplified by, but not limited to, a set of dashboards that are specific to either an individual data subject or a company to track the flow of data and value relevant to either the specific data subject or company. Both core and peripheral service layer components may be provided as basic services to the platform and a commission may be charged to slot into the platform 101. For example, the dashboard can include any view on the metadata surrounding a data subject (i.e., see the flow of his data as it moves through the processing chains of the platform participants).

Stakeholders in said platform ecosystem may benefit in the following ways: Individuals whose data is accessed or transformed through the platform 101, hereafter referred to as users or data subjects may have control of and visibility into their data flows 102a, data 122a, and privacy of data, and may monetize their own data thereby earning digital currency for participation. Users may discover services and/or products through directed immersion into such an ecosystem, for example, content targeting engines utilizing meta-information. Consumer nodes 103, 104a, 104b, and 105 of any product or service that depend on the platform 101 may benefit by having less invoices to process, together with transparency of value generation. In addition, market forces have the ability to drive competition to deliver the highest quality output at lowest cost together with access to a large network motivated by market needs and positive multiparty networks. More participation leads to more competition, with the curation having a positive impact. Partners, for example (see FIG. 1) data acquisition entities 103 and data transformation entities 104, will be able to focus on their own products, signal processing and optimizing algorithms and research. Product and service entity partners will be able to focus on customer experience and business development, and gain access to a variety of potential data and/or context and/or analysis providers without requiring a direct formal relationship. Product and service entities need not be locked into a specific feed and/or algorithm, and can support multiple as well as switch to the most suitable feed and/or algorithm with minimum overhead. For example, an entity might subscribe to node A's sleep algorithm, but node B may be able to come up with a better algorithm at a lower price, allowing the person to move a subscription without being locked in. Moreover, product and service entities will have access to a rich source of data, transformation and information streams with which to build products and/or services. Common generic frameworks will also be available to abstract and simplify communication with the platform 101 through use specific of API gateways or custom designed integration.

Services may also run on the platform 101, with the goal of pushing content to consumer services, subscribers or users. An example includes, but is not limited to, utilizing metadata generated by the ledger database as new input to the consumer services, subscribers or users, thereby creating a feedback loop.

Flow Descriptions

1. Message Flow

In particular embodiments of the invention, the platform 101 sends and receives messages 122b between nodes in order to a. inform services 112 of new subscriptions and b. to inform subscribers of new data available for a service. In an aspect, the platform 101 acts as the hub for the message 122b, and the nodes (103, 104a, 104b, and 105) are spokes. This hub-and-spoke message topography allows for fast coordination between parties that might not have direct relationships while having a central authorization system (i.e., the DBN platform 101) that ensures privacy and security around the flow of data. In an aspect, the data flows peer to peer from node to node, as it is available and requested (and coordinated through the platform 101). In an aspect, the platform 101 can be considered a hub. The hub here is used as a topographic description of the platform 101 as it relates to the nodes 103, 104a, 104b, and 105. The interaction space of the platform 101 is on the hub, nodes are thus operating on and through the platform 101. This is illustrated, for example, in FIG. 2, where platform 101 communicates with each node over a network 201. In this sense the Hub relates to the part of the platform 101 that does the coordination, facilitation and logging roles. The subscription message sent from the hub/DBN platform 101 to the service node 112 (e.g., a third party server that uses the information in some way) includes all the information needed in order for the service node 112 to either subscribe to the next service it depends on, or to get the appropriate data from outside the network. In an aspect, these are services by other nodes. A service can depend on the output of other services. In this case, it will subscribe to those services with the relevant requirements, once someone subscribes to it. Services may be provided by the hub in the same fashion, in which case the hub acts like a service node during that interaction.

The hub/DBN platform 101 does not hold or transmit data subject-specific identifiable information, for example, but not limited to a name and contact information, to or from the contributor nodes 103, 104a, 104b, and 105. Concretely, a device identifier, e-mail address or API token, is not shared with transformation service nodes 104; rather, the transformation service nodes 104 receive a GUID that allows the hub/DBN platform 101 to provide the information to upstream service node 104 that actually needs it, and is authorized to have the information. The publish message 122b sent from the service node 112 to the hub/DBN platform 101 includes all the information needed by the subscribers to access the data output of the service. In other words, the message flow is used to coordinate data flows. The message flows happen between the hub/platform 101 and the nodes, while the data flow happens between nodes. The service node sends information stating that new data is available on a specific service or subscription for a subject. The platform then sends a message to all the specific subscribers (nodes/services that subscribed for data receipt) about the data being available. The hub/DBN platform 101 relays publish messages to subscribing nodes.

For example, when a first node (e.g. node 103) sends a publish message to the platform 101 indicating that de-identified data related to a data subject is ready to be used, the platform 101 sends messages to the corresponding nodes (e.g. 104a, and 104b) that are subscribed. To enable the subscribed node to access the de-identified data, in an embodiment, the first node (e.g. node 103) sends a token to the platform 101. The token identifies the GUID associated with the data subject for that particular node.

The platform 101 receives the token containing the GUID for node 103, and determines from its own lookup table the corresponding GUID for the same data subject for the subscribed node (e.g. node 104a). Platform 101 sends a message to the subscribed node that identifies the data subject using that data subject's GUID for the subscribed node, and includes a token containing an encrypted version of the GUID for the publishing node (e.g. node 103). The token containing the GUID for the publishing node may be generated by either the publishing node or DBN platform 101. Even though the subscribed node receives the token containing the publishing node's GUID, the subscribed node cannot read the publishing node's GUID because it does not have the corresponding decryption key. Instead, the subscribed node sends a data request to the publishing node which includes the encrypted token. The publishing node (e.g. node 103) receives the data request and token from the subscribed node (e.g. node 104a). The publishing node decrypts the GUID stored in the token with its own decryption key (as shared in a key relationship between the publishing node and DBN platform 101). In an embodiment, the publishing node first sends the token to the DBN platform for verification, and then decrypts the GUID upon receiving a verification response from the DBN platform. Once the GUID has been decrypted by the publishing node, the publishing node can identify the specific data subject whose data is being requested. The publishing node then sends the requested de-identified data (that is, the data subject's data without any information that could be used to identify the data subject) in a reply to the subscribed node's request. Because the subscribed node knows its own GUID that corresponds to its earlier data request, the subscribed node correlates the data returned in response to that request to its own GUID. In this manner, a data subject's de-identified data may be transmitted to a subscribed node to perform a service, without either the subscribed node or the DBN platform 101 having any information identifying the data subject. And, such data exchange occurs without either node knowing the GUID corresponding to the same data subject for the other node.

Data can continue to be passed from node to node in a similar manner, by exchanging tokens generated by either the publisher node or DBN platform 101 in accordance with each node's GUID.

2. Data Flow

In some embodiments, data 122a is transmitted via data flows 102a in a peer-to-peer relationship directly from the service node to the subscribing nodes once the subscribing node requests the data 122a from the service node using the information in the publish message sent via the hub as described above. An exception may be where an intermediary storage service hosts the result for subscribers to fetch.

3. Money Distribution Flow

In certain embodiments, metadata collected by the hub/platform 101 is stored in a ledger database 106 that allows value distribution in proportion to contributions by services and individuals towards the generation of output. Individuals registered on the hub that contribute, authorize, and provide consent for their data to be used can be paid for their data using digital and/or non-digital currency. Nodes presenting information to clients outside the network may pay the hub for the data. The hub may subsequently calculate revenue shares based on contribution and costs of service and do bulk distribution and reconciliation of value between data subjects, services, nodes (all participants; individuals, and companies).

The following is an example of how the DBN platform 101 can work in a particular situation. A consumer node Z (e.g., an insurer) is interested in the datastream D (ex. sleep quality) of a data subject C which is already a customer of Z. Z sends a message 122b to the DBN platform 101 to subscribe to a Sleep Quality service Y using its de-identified reference to C's sleep monitor. The DBN platform 101 checks that C's sleep monitor is compatible with the input requirements of Y and then sends a message to Y's node with the subscription details including the (unique to C and Y) de-identified references to C and C's sleep monitor. Y gets the subscription message and sends a message to the DBN platform 101 to subscribe to the Data Supply service node X that provides the raw sleep monitor data to the network. The DBN platform 101 sends a message to X with the details required to get the data for C's device. C has a relationship with X and a relationship with Z. He has authorized both to act on his data. Once X has received new data for C's sleep monitoring device, X will send a publish message to the DBN platform 101 with whatever information is needed for a subscriber to fetch the data. This may include access credentials and API endpoints on X's servers; or even an instruction for the DBN platform 101 to assign access tokens on X's behalf to valid subscribers. The DBN platform 101 will then check for valid subscriptions and send a publish message to Y. Y will get the publish message, and will fetch the data from X. Y will then perform the transformation on the raw data quantifying the sleep quality D. Y will then send a publish message to the DBN platform 101, which will send the message on to valid subscribers. Z will get the message from the DBN platform 101 and fetch the D from Y. Y never knows whose data is being processed or what specific device identifier was used. Both C and D are de-identified. D can flow from X through Y to Z without compromising personal identifiable information. The data flows directly peer-to-peer between X, Y and Z while coordinating messages all bounce through the DBN platform 101, which stores and analyses the metadata, but never sees the content/data. C trusts the device company (X) and the insurer (Z) but does not need to trust Y or the DBN platform 101, as they do not have identifiable information about C. The DBN platform 101 knows enough in order to facilitate connecting data flows, but not enough to identify someone.

Figure 4:
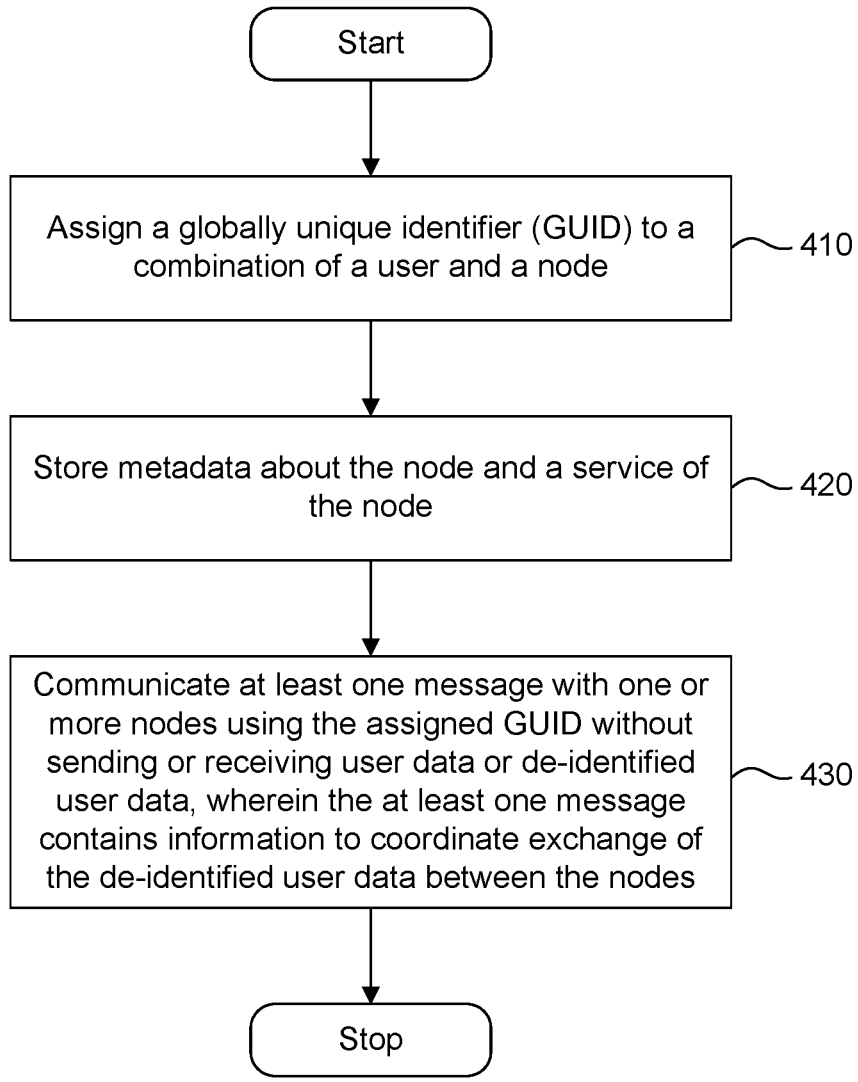
FIG. 4 is a flowchart illustrating steps for exchanging de-identified data, according to an example embodiment.

FIG. 4 is a flowchart illustrating a method 400 for exchanging de-identified data between nodes, according to an example embodiment. Method 400 may be performed by processing logic that may include hardware (e.g., circuitry, dedicated logic, programmable logic, microcode, etc.), software (e.g., instructions run on a processing device), or a combination thereof. In an embodiment, some steps in FIG. 4 may not need to be performed in the exact order shown, as one skilled in the art would understand. In an embodiment, the method of FIG. 4 is performed by DBN platform 101 as described above.

In step 410, a GUID is assigned to a combination of a user and a node from a plurality of nodes, wherein a different GUID is generated for each combination of the user and the node from a plurality of nodes. In step 420, metadata about the node and a service of the node is stored on the platform in, for example, a database. In step 430, at least one message is communicated between the data exchange system with one or more nodes using the assigned GUID, without sending or receiving the user's identifying data or de-identified user data. The message contains information to coordinate exchange of the de-identified user data between the plurality of nodes, for example as described above regarding the publish/subscribe messages and token exchange.

Figure 2:
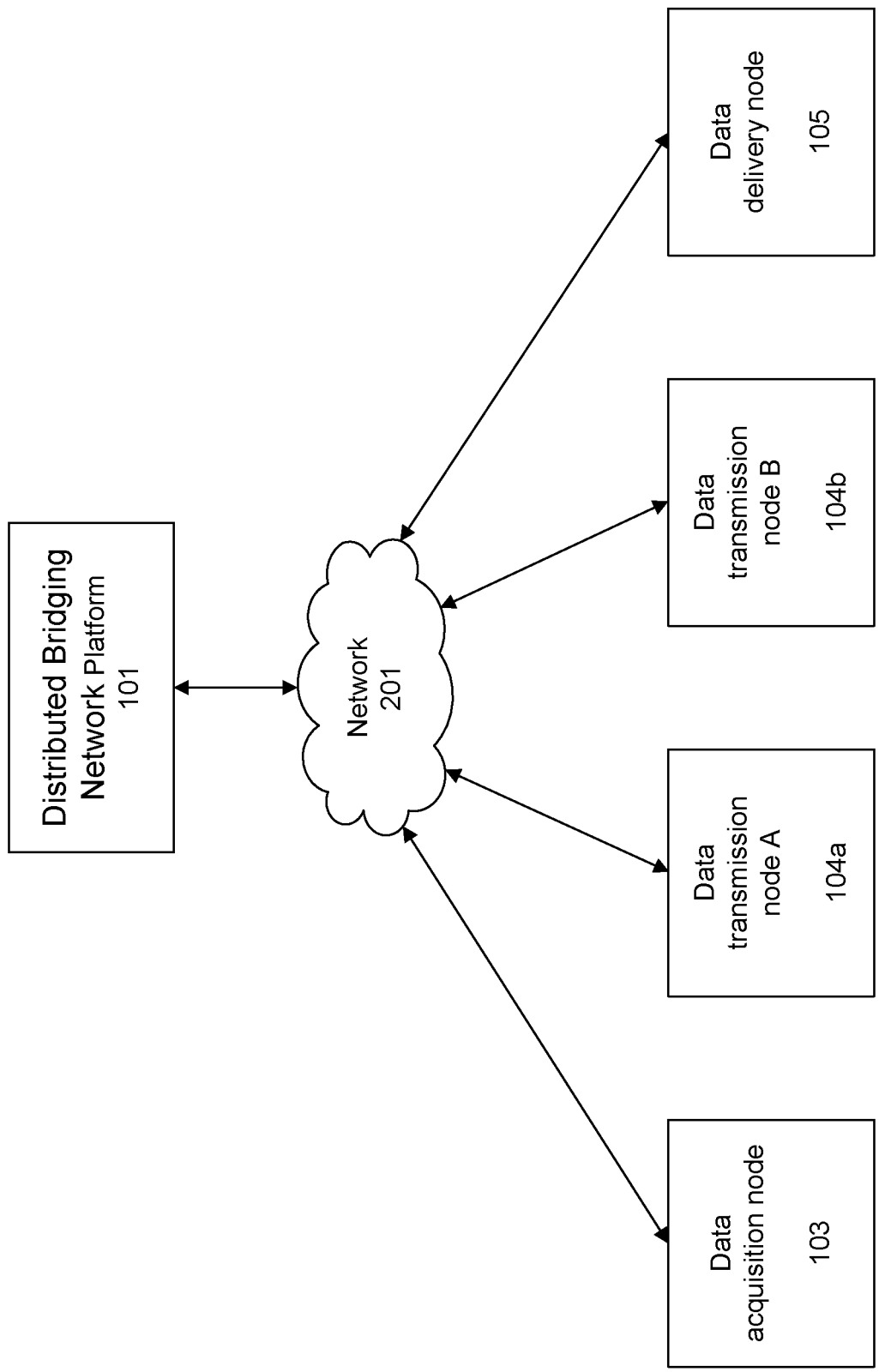
FIG. 2 is a block diagram illustrating a DBN platform and nodes that are involved in a de-identified data exchange, according to an example embodiment.
Figure 3:
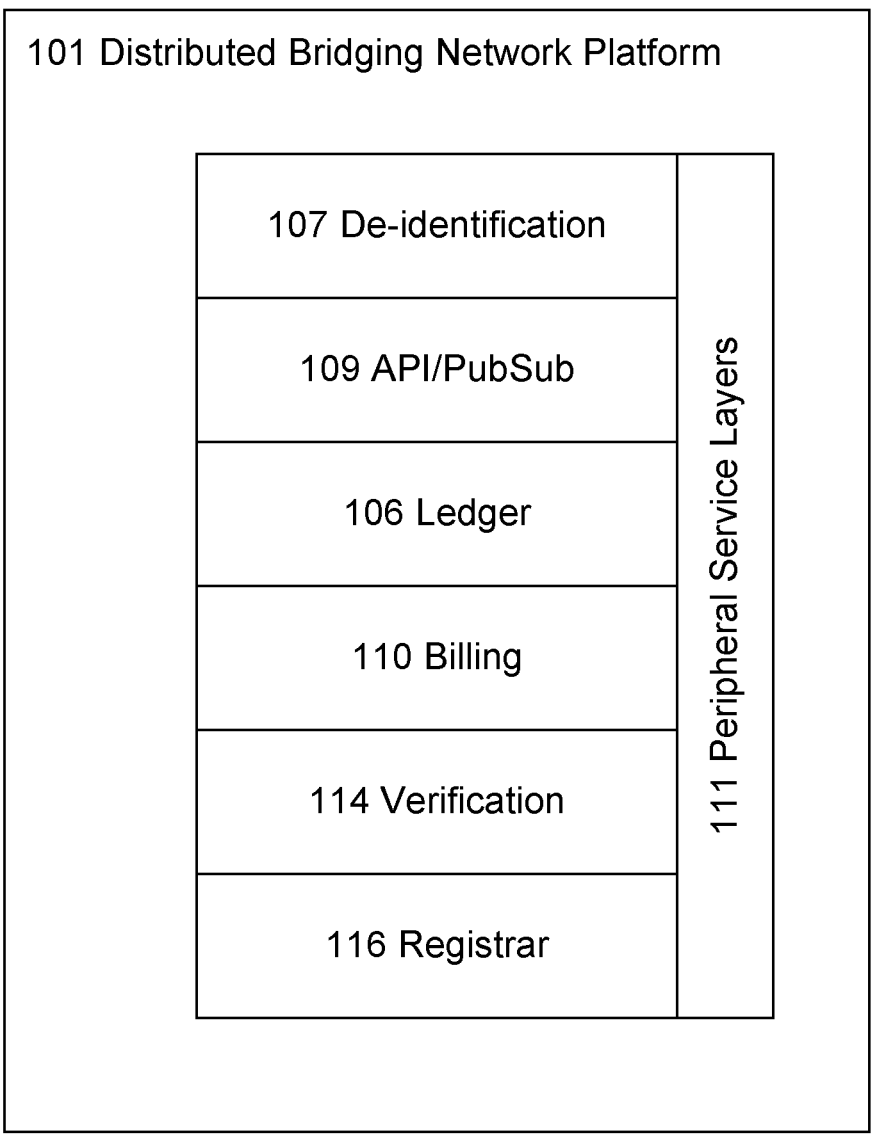
FIG. 3 is a block diagram illustrating components within a DBN platform, according to an example embodiment.
Figure 5:
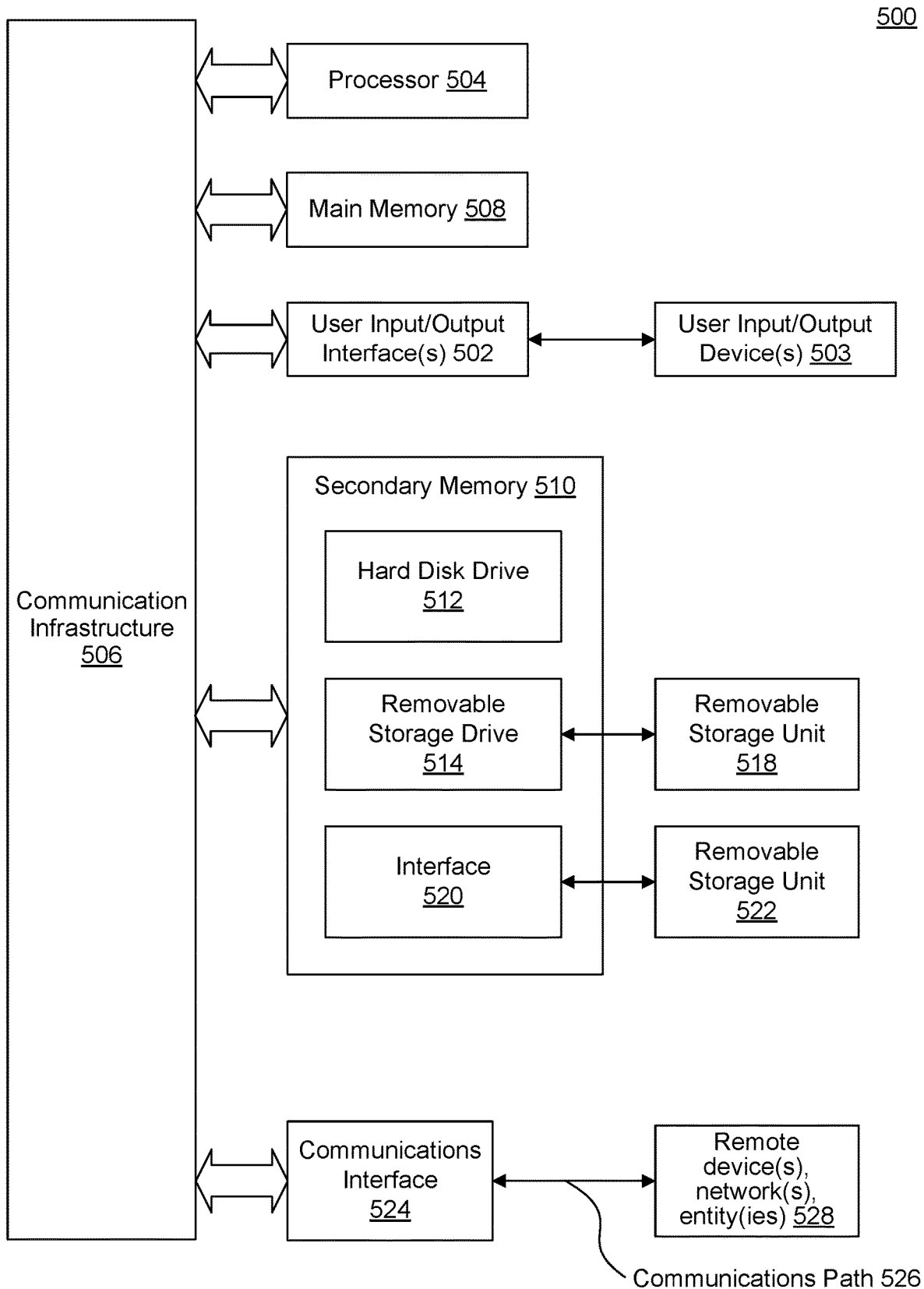
FIG. 5 is an example computer system useful for implementing various embodiments.

FIG. 5 is an example computer system that may be used to implement aspects of the systems illustrated in FIGS. 1-3, or which may be specially programmed to implement aspects of the process illustrated in FIG. 4. Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518.

Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an example embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the present disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. A computer system to coordinate data exchange comprising:
   (a) a processor;
   (b) memory adapted to store data and program instructions executable by the processor, wherein the processor is configured to coordinate data exchange associated with a particular data subject between a plurality of nodes without identifying the particular data subject by calling on;
   (c) a de-identifying unit configured to:
   assign a first globally unique identifier (QUID) to a first combination of the particular data subject and a first node from the plurality of nodes, and
   assign a second globally unique identifier (GUID) to a second combination of the particular data subject and a second node from the plurality of nodes, wherein the first GUID and second GUID are created when the particular data subject has granted the first node and the second node access to the associated data;
   (d) a ledger database configured to store metadata of the first node and the second node and at least one service of the first node and the second node; and
   (e) a messaging unit configured to:
   communicate at least one message with the first node and the second node using the first QUID for the first combination and the second GUID for the second combination without sending or receiving data including de-identified data associated with the particular data subject, wherein the associated de-identified data is a subset of the data associated with the particular data subject, directly coordinate exchange of the associated de-identified of the particular data subject data between the first node and the second node using information for the first node and the second node in the at least one message to provide the service on the associated de-identified data;

wherein the computer system lacks access to the data associated with the particular data subject including de-identified data, thereby, maintaining privacy of the data of the particular data subject; and wherein the de-identified data of the particular data subject is at least one of physiological data, computer or smartphone application data, insurance data, actuarial data, medical records data, genetic data, or Global Positioning System (GPS) data.

2. The system of claim 1, further comprising: an authentication and authorization unit configured to allow trusted communication between the first node and the second node.

3. The system of claim 1, further comprising a billing engine configured to calculate a monetary value corresponding to the services of at least one of the plurality of nodes.

4. The system of claim 3, wherein the billing engine conducts financial transactions with the at least one node based on the calculated monetary value.

5. The system of claim 1, further comprising a verification system configured to ensure the service of the first node uses the associated data of the particular data subject as specified.

6. The system of claim 1, further comprising a peripheral service layer configured to provide one or more dashboards to track a flow of the associated de-identified data of the particular data subject.

7. The system of claim 1, wherein the at least one message is one of a subscription message, publish message, or message containing the metadata about the first node and the service of the first node.

8. The system of claim 2, wherein the authentication and authorization unit utilize a token comprising the GUID for the particular data subject of the first node, wherein the system sends the token to the second node, and wherein the second node sends the token to the first node to initiate the exchange of de-identified data.

9. A method for coordinating data exchange of a user, the method comprising:
(a) assigning a first globally unique identifier (GUID) to a first combination of the user and a first node;
(b) assigning a second globally unique identifier (GUID) to a second combination of the user and a second node, wherein the first GUID and second GUID are created when the particular data subject has granted the first node and the second node access to the associated data;
(c) storing metadata of the first node and the second node and at least one service of the first node and the second node;
(d) communicating at least one message with the first node and the second node using the first GUID for the first combination and the second GUID for the second combination without sending or receiving data of the user data, wherein de-identified user data is a subset of the user data
(e) directly coordinating exchange of the de-identified user data of the user between the first node and the second node without accessing user data, thereby maintaining privacy of the user data, using information for the first node and the second node in the at least one message, wherein the first node and second node provide the at least one service on the de-identified data; and wherein the de-identified data of the particular data subject is at least one of physiological data, computer or smartphone application data, insurance data, actuarial data, medical records data, genetic data, or Global Positioning System (GPS) data.

10. The method of claim 9, further comprising allowing trusted communication between the first node and the second node two or more nodes from the plurality of nodes by utilizing a token comprising the GUID for the first combination, wherein the token is sent to the second node, and wherein the second node sends the token to the first node to initiate the exchange of de-identified data.

11. The method of claim 9, further comprising calculating a monetary value corresponding to at least one service of the second node.

12. The method of claim 11, further comprising conducting financial transactions with the second node based on the calculated monetary value.

13. The method of claim 9, further comprising ensuring the service of the second node uses the user's data as specified.

14. The method of claim 9, wherein the at least one message is one of a subscription message, publish message, or messages containing the metadata about the second node and the at least one service of the second node.

15. The method of claim 9, wherein assigning of GUIDs further comprises ensuring the user has granted the first node and the second node access to the user data.

16. A non-transitory computer readable storage medium having instructions stored thereon that, in response to execution by a computing device, cause the computing device to perform operations to coordinate data exchange of a user between a plurality of nodes, the operations comprising:
(a) assigning a first globally unique identifier (GUID) to a first combination of the user and a first node from a plurality of nodes;
(b) assigning a second globally unique identifier (GUID) to a second combination of the user and a second node from the plurality of nodes, wherein the first GUID and second GUID are created when the particular data subject has granted the first node and the second node access to the associated data;
(c) storing metadata of the first node and the second node and at least one service of the first node and the second node;
(d) communicating at least one message with the first node and the second node using the first GUID for the first combination and the second GUID for the second combination without sending or receiving the user data or de-identified user data, wherein the de-identified user data is a subset of the user data
(e) coordinating exchange of the de-identified user data directly between the first node and the second node using information for the first node and the second node in the at least one message to provide the at least one service on the de-identified data;
wherein the non-transitory computer readable storage medium lacks access to the user data or user de-identified data, thereby maintaining the privacy of the user data; and wherein the de-identified data of the particular data subject is at least one of physiological data, computer or smartphone application data, insurance data, actuarial data, medical records data, genetic data, or Global Positioning System (GPS) data.

17. The non-transitory computer readable storage medium of claim 16, the operations further comprising allowing trusted communication between the first node and the second node.

18. The non-transitory computer readable storage medium of claim 16, the operations further comprising calculating a monetary value corresponding to the at least one service of the first node or the second node and conducting financial transactions with the first node or the second node based on the calculated monetary value.

* * * * *